United States Patent [19]

Costain

[11] 3,943,235
[45] Mar. 9, 1976

[54] PROCESS FOR PRODUCING SILVER AZIDE

[75] Inventor: Thomas S. Costain, Sparta, N.J.

[73] Assignee: The United States of America as represented by the Secretary of the Army, Washington, D.C.

[22] Filed: July 11, 1974

[21] Appl. No.: 487,836

[52] U.S. Cl. .............................................. 423/410
[51] Int. Cl.$^2$........................................ C01B 21/08
[58] Field of Search .......... 423/34, 42, 410; 23/300, 23/301 R, 305

[56] References Cited
FOREIGN PATENTS OR APPLICATIONS

| | | | |
|---|---|---|---|
| 781,440 | 8/1957 | United Kingdom................. | 423/410 |
| 877,141 | 1/1962 | United Kingdom................. | 423/410 |

OTHER PUBLICATIONS

Mellor, "A Comprehensive Treatise on Inorganic & Theoretical Chemistry," Longmans, Green & Co., New York, N.Y., Vol. 8, 1928, p. 349.

*Primary Examiner*—Earl C. Thomas
*Attorney, Agent, or Firm*—Nathan Edelberg; Robert P. Gibson; A. Victor Erkkila

[57] ABSTRACT

Silver azide crystals of relatively high bulk density and possessing good flowing and initiating properties are obtained by crystallization from aqueous ammonia solution obtainable by double decomposition of silver nitrate and sodium azide in aqueous ammonia solution. The crystallization is accomplished by distilling the ammonia from the solution until the silver azide begins to crystallize, then adding a small amount of acetic acid to induce formation of crystalline nuclei of silver azide, and continuing the distillation of the ammonia until the silver azide is completely precipitated. The silver azide precipitate thus obtained, when isolated, washed and dried, yields a free-flowing granular product of relatively high bulk density and consisting predominantly of cubical crystals.

5 Claims, No Drawings

PROCESS FOR PRODUCING SILVER AZIDE

BACKGROUND OF THE INVENTION

The superiority of silver azide over lead azide for use as an initiating explosive has long been recognized. However, the high cost and difficulty of producing silver azide in a granular form suitable for loading into detonator caps have drastically limited its use to those situations where its superior chemical stability and detonation properties have mandated its use despite its high cost. Recently, a need has developed for miniature detonating trains, wherein the more efficient explosive silver azide would function suitably whereas lead azide would not. Previous processes for producing silver azide suitable for use as an explosion initiator generally involved reaction of sodium azide with a soluble silver salt, e.g. silver nitrate, in aqueous solution in the presence or absence of a base, preferably ammonia. When silver azide is prepared by reacting aqueous solutions of sodium azide and silver nitrate, the silver azide formed precipitates as a voluminous and relatively unsatisfactory product. Improvements over such process have been developed in which the double decomposition of sodium azide and silver nitrate is effected in aqueous ammonia solution, wherein the silver azide formed is soluble, after which an acid, such as nitric acid, is added to neutralize the ammonia and precipitate the silver azide. The silver azide, when washed and dried, is obtained thereby in crystalline form possessing superior flowing and initiating properties (G. W. C. Taylor, The Manufacture of Silver Azide R.D. 1336, ERDE Report No. 2/R/50, Waltham Abbey, Essex, England, 1950; corresponds with British Pat. No. 781,440. See also British Pat. No. 887,141 which precipitates silver azide from an ammoniacal solution by addition of carbon dioxide). However, while these improved processes have advanced the art, they are nonetheless deficient in some respects, for example, they are relatively time consuming, costly and produce a silver azide product of relatively low bulk density, an important factor in detonator loading.

SUMMARY OF THE INVENTION

Accordingly, it is an object of the present invention to provide a process for the preparation of silver azide in free-flowing granular form of high bulk density possessing good explosion initiating properties.

Another object is to provide an improved process for crystallizing silver azide from aqueous ammonia solution.

A further object is to provide an efficient and economical process for producing silver azide in high yield and purity.

In accordance with this invention, these and other objects can be obtained by reacting sodium azide and silver nitrate in aqueous ammonia solution of sufficient concentration to maintain the silver azide formed in solution, and then crystallizing the silver azide from the solution by distillative removal of the ammonia from said solution. More specifically, the ammonia is distilled from the ammoniacal silver azide solution until incipient crystallization of silver azide therefrom takes place. At this point a small amount of acetic acid or other suitable acid is added sufficient to induce "seeding", i.e. formation of crystalline nuclei of silver azide. Thereafter, the distillation of ammonia is continued with vigorous agitation of the solution until the silver azide is substantially completely precipitated. The precipitated silver azide can be separated from the mother liquors by filtration, washed and dried in conventional manner.

DESCRIPTION OF THE PREFERRED EMBODIMENTS

The following examples illustrate specific embodiments of the method of carrying out the process of the present invention.

EXAMPLE 1

150 ml. of 2N aqueous silver nitrate solution were charged to a 600 ml. stainless steel beaker heated by a water bath and provided with a 2 inch, 3 bladed stainless steel propeller agitator positioned on the center line approximately one inch from the bottom of the beaker. Then 80 ml. of 15N ammonium hydroxide and 150 ml. of 2N aqueous sodium azide solution were added while rotating the propeller agitator at 150 RPM. The agitator speed was then increased to 800 RPM and the mixture rapidly heated to 75°C. Within about 20 minutes the first silver azide precipitate appeared. Then 5 ml. of 3N acetic acid was added dropwise in 5 minutes to induce the formation of seed crystals. The mixture was then heated from 75°C. to about 95°C. in about 10 minutes and held at 95°C. for 45 minutes to distill off the ammonia, while maintaining the agitator speed at 800 RPM. The mixture was then cooled to room temperature (18°C.) in about 8 minutes, during which 5 ml. of 3N acetic acid was added within 2-3 minutes after the mixture reached 50°C. During the distillation about 200 ml. of water were added to wash down the crust formed on the beaker wall and agitator shaft and to maintain the same approximate volume of liquid in the beaker. The silver azide precipitate thus obtained was separated as a cake by filtration, and the cake was washed twice by decantation with 300 ml. of water, passing the washes through a polyethylene Buchner filter to recover floating crystals. The product was transferred to the filter with a stream of water and the filter cake was washed in place with denatured ethyl alcohol, then with methanol and finally air dried with suction. The air-dried product weighed 43.7 grams, corresponding with 97% theory yield. It was a free-flowing granular product consisting mostly of cubical crystals with a small percentage of flat and dendritic crystals and had a bulk density of 1.41 grams/ml. Substantially all of the product passed through a 50 mesh screen and was retained on a 200 mesh screen.

EXAMPLE 2

2 liters of 2N (340 g/l) silver nitrate solution and 1.07 liters of 28% ammonium hydroxide were charged to a jacketed stainless steel kettle of 10 liter capacity fitted with a 5 inch diameter 4 blade propeller-type agitator and a 1 inch wide vertical baffle. Two liters of 2N (130 g/l) sodium azide solution were then added while operating the agitator at 300 RPM. The agitator speed was increased to 500 RPM and the contents were heated with jacket steam to 75°C. in 5 minutes. About 5 minutes thereafter the previously clear soltion, corresponding to about 3N ammonium hydroxide, turned milky, indicating that silver azide had started to precipitate. At this point 50 ml. of 3N acetic acid were introduced over a 5 minute period to induce the formation of seed crystals. During the heating to distill off the ammonia, distilled water was added at the rate of 40–60 ml./minute to replace liquid lost through evaporation. After being held at 75°C. for a total of 30 minutes, the kettle contents were heated to 97°C. in 10 minutes; and then during the next 60 minutes the contents were heated to 99°C. (boiling point of water at 1,000 ft. above sea level), indicating that virtually all the ammonia had been distilled off. The addition of make-up water was then stopped (a total of 3.5 l. was added) and immediately thereafter the contents were cooled to 30°C. in 10 minutes by circulating cold water through the jacket. During the cooling period 50 ml. of 3N acetic acid were added to neutralize the last traces of ammonia and reduce loss of valuable silver in the mother liquor. The agitation was then discontinued, the precipitated silver azide crystals were allowed to settle and the supernatant liquor decanted. The product was washed twice by decantation using 3 liters of distilled water for each wash. Finally the product was washed onto a cloth bag covered filter, washed with 95% ethanol and air dried for 40 hours at 50°C. (A small amount of product remained crusted on the kettle walls, agitator shaft and baffle at the water line.) 540 grams of silver azide were obtained thereby, corresponding to 90% of the theoretical yield.

Thus, the present invention rapidly and efficiently produces a silver azide product of high quality in free-flowing granular form. The bulk density, an important factor in detonator loading, of silver azide made by the process of this invention is up to 40% higher (1.4 vs. 1.0 g/ml.) than that of silver azide made by the British process disclosed in the aforesaid ERDE Report No. 2/R/50. Also, in the aforesaid British process it is necessary to add dilute solutions to the reactants at slow, uniform and exact rates for form granules of silver azide by concretion, whereas in the process of the present invention the concentration and addition parameters are noncritical and crystallization occurs by accretion. Further, the product of the present invention is in the form of mostly cubical crystals with a few percent of dendritic crystals. It has been reported that long colorless crystals which explode on breaking are obtained from ammonium hydroxide solutions of silver azide (U.S. Army Materiel Command Pamphlet AMCP 706-177, Engineering Design Handbook, "Properties of Explosives of Military Interest," Jan., 1971, page 322). The process of this invention avoids the formation of such crystals.

Table I shows that silver azide produced by the present process, as illustrated by the foregoing examples, is equal in purity to silver azide produced by the aforementioned British process.

TABLE I

| | Analysis of Silver Azide | | | |
|---|---|---|---|---|
| | % Moisture | Hygroscopicity | % Silver* | % Azide* |
| British Process | 0.067 | 0.00 | 72.00–71.93 | 27.85–27.85 |
| Present Process | 0.027 | 0.01 | 71.97–71.93 | 27.99–28.10 |

*Theoretical Composition Silver — 71.97  Azide — 28.03

Similarly, as shown in Table II, safety and stability tests on silver azides produced by the British process and the present process gave almost identical results within normal statistical variation.

TABLE II

| Type of Silver Azide Tested | Minimum Value in P.A. Impact Test W/2 kg Weight | Minimum Electrostatic Sensitivity | Milliliter of Gas From 1-gram Sample in 40 Hours at 150°C. |
|---|---|---|---|
| British Process | 7 inches | 0.008 Joules | 0.33 |
| Present Process | 7 inches | 0.007 Joules | 0.45 |

Comparative tests of performance in small detonators were conducted on silver azide products made by the British process and by the present process. The tests utilized an explosive train, wherein an 0.068 inch diameter aluminum detonator cap tube was packed with a layer of the silver azide sandwiched between a layer of primer and a layer of finely divided RDX (cyclotrimethylenetrinitramine). The tube was packed as follows: The primer was first loaded under a pressure of 70,000 psi. to a thickness of 0.020 in. The silver azide and RDX were then loaded each under a pressure of 15,000 psi. For the tests the combined thickness of the silver azide and RDX layers was held constant at 0.110 in., and the ratio of the silver azide layer A, measured in thousandths of an inch of loaded thickness, to the RDX layer R, also measured in thousandths of an inch of loaded thickness, was varied from 30:80 to 80:30 in increments of ten thousandths of an inch. The primer used was NOL-130 (Composition: basic lead styphnate 40%, barium nitrate 20%, lead azide 20%, tetracene 5%, and antimony sulfide 15%) and its height was held constant at 0.020 in. throughout the tests. All detonators were fired against a ⅛ in. thick steel witness disk to produce a dent which was measured to provide an indication of the power of the detonators so loaded. The results given in Table III show that the silver azide produced by the present process is capable of initiating the RDX in such a manner that the resultant denting of the steel plate is equal to the dents produced by RDX initiated by similar quantities of silver azide produced by the British process within normal statistical variation.

TABLE III

| Type of Silver Azide Used in the .068-inch Diameter Detonator | Average of Five (5) Dents in Steel Plate Produced by Detonator Loaded in the Ratio A to R of: | | |
|---|---|---|---|
| | 80/30 | 50/60 | 30/80 |
| British Process | .0086 inch | .0100 | .0094 |
| Present Process | .0108 | .0092 | .0084 |

The foregoing test results show that the silver azide product made by the process of this invention is equal in all important characteristics to the product from the best previously known, i.e. the aforementioned British process.

In carrying out the process of this invention, the concentrations and manner of mixing of the silver nitrate, sodium azide and aqueous ammonia (ammonium hydroxide) solutions can be varied widely, so that the process can be readily controlled. Of course, the concentration of the aqueous ammonia must be sufficient initially to maintain the silver azide in solution. In the foregoing examples the ammoniacal silver azide solution obtained in the reaction corresponds to approximately 3 normal ammonium hydroxide solution and contains about 120 grams per liter of dissolved silver azide. Substantially larger amounts of silver azide can be dissolved in more concentrated ammonia solutions. For example, up to about 200 grams/liter of silver azide can be dissolved in 5 normal aqueous ammonia. Thus, by use of such concentrated solutions the present process can achieve a high production capacity for manufacturing silver azide.

In the process of the present invention the silver azide is precipitated from its solution in aqueous ammonia by removing the ammonia by distillation rather than by neutralizing the ammonia with an acid, as in prior art processes. For optimum results, the ammonia is distilled until the first crystals of silver azide separate from the solution. At this point a small quantity of acetic acid, or other acid inert to silver azide, is added to induce seeding and results in profuse nucleation ("shock crystallization"). For this purpose about 5 mol percent of acetic acid, based on the amount of silver azide in solution, is sufficient and suitable for achieving uniform bulk density and desirable granulation range of the silver azide product produced. After the addition of acid to effect "seeding", the distillation of ammonia is continued until the silver azide is substantially completely precipitated. During the distillation of the ammonia, the solution is vigorously agitated. Vigorous agitation, which produces turbulence, particularly top to bottom turnover of the crystallization mixture, during this distillation-crystallization step is very important, since otherwise a reduction of bulk density and an increase in large flat crystals of the silver azide takes place. The precipitated silver azide crystals can be separated from the mother liquor, washed and dried in known manner. Prior to separation of the precipitated silver azide crystals, a small amount of acetic acid is added to neutralize the last traces of ammonia remaining in the mother liquor and thereby reduce loss of valuable silver in said liquor.

The foregoing disclosure is merely illustrative of the principles of this invention and is not to be interpreted in a limiting sense. I wish it to be understood that I do not desire to be limited to exact details of construction shown and described, because obvious modifications will occur to a person skilled in the art.

What is claimed is:

1. A process for producing a silver azide product in a free-flowing, dense crystalline form having good explosion initiating properties, which comprises preparing a solution of silver azide in aqueous ammonia solution by reacting silver nitrate and sodium azide, removing ammonia from the solution by distillation until incipient crystallization of silver azide from the solution takes place, adding a small amount of an acid to induce the formation of seed crystals of silver azide, continuing the distillation of the ammonia until crystallization of the silver azide is substantially complete while subjecting the liquid to vigorous agitation, whereby the silver azide is produced predominantly in the form of cubical crystals, and separating the resulting silver azide crystals from the liquid mixture.

2. The process of claim 1, wherein the acid is acetic acid.

3. The process of claim 2, wherein the amount of acetic acid is about 5 mole percent of the total amount of silver azide present in the solution.

4. The process of claim 1, wherein the aqueous ammonia solution is about 3 normal and the concentration of the dissolved silver azide is about 100 grams per liter.

5. The process of claim 1, wherein the concentration of the aqueous ammonia solution is at least about 1 normal and the concentration of the dissolved silver azide is at least about 20 grams per liter.

* * * * *